United States Patent Office 3,343,055
Patented Sept. 19, 1967

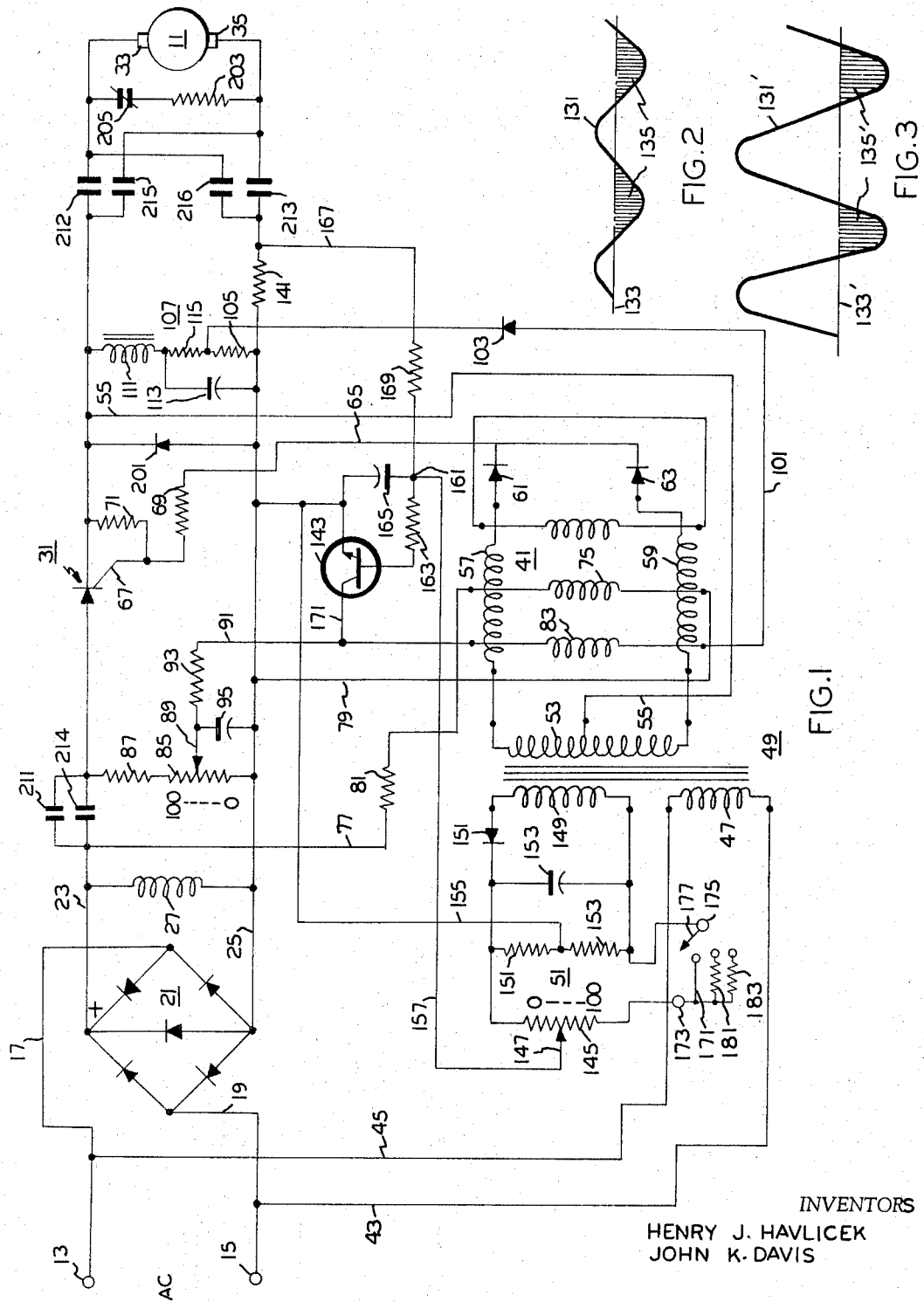

3,343,055
ADJUSTABLE MOTOR SPEED AND TORQUE
LIMIT CONTROL CIRCUIT
Henry J. Havlicek, York, and John K. Davis, Dover, Pa.,
assignors to Fincor, Inc., a corporation of Pennsylvania
Filed Jan. 13, 1965, Ser. No. 425,131
5 Claims. (Cl. 318—332)

ABSTRACT OF THE DISCLOSURE

This invention relates to a direct current motor control circuit for applying DC pulsating voltage to the armature of the motor. It comprises a full wave rectifier bridge for converting AC into pulsating DC and includes a potentiometer for deriving an adjustable reference potential level from the DC for speed control. An SCR is connected to be responsive to the DC for applying at least a portion thereof to the armature of the motor. A magnetic amplifier includes a controlled winding responsive to the adjustable reference potential level to gate the SCR at selected times during the DC pulsations to determine the portion of DC applied to the armature. A low pass filter is connected in parallel with the armature and is responsive to the portion of DC to modify the adjustable reference potential level at the control winding. A resistor is connected in series with the armature for deriving a voltage proportional to the armature current. A further potentiometer is included for establishing a torque reference voltage in accordance with the predetermined maximum load current. Finally, transistor switching means responsive to the torque reference voltage and the armature current voltage modify the effective adjustable reference potential level at the control winding whenever a predetermined one of the voltages exceeds the other.

The present invention relates to an improved apparatus enabling adjustable setting and control of DC motor speeds, as well as provision for automatic torque or current limit control.

In general, the invention employs the well-known silicon controlled rectifier (SCR) devices to supply the requisite amounts of power to the armature of a DC motor in accordance with changes of the speed setting control. A self-saturating magnetic amplifier gates one or more SCR's in accordance with the SCR pulsating applied armature voltage, as referenced to the rectified full wave speed control DC voltage level set. A torque or current limit control also provides a reference relative to armature current to establish a maximum or full load level thereby protecting the motor and components. The latter control may modify the former control partially or totally, as required.

A unique arrangement is provided for sampling the controlled pulsating voltage magnitude applied to the armature relative to the DC reference potential level dialed on the speed control potentiometer. The sample actually represents a portion of the applied voltage developed in a circuit which bypasses spurious frequency spikes and random noise manifestations while also smoothing the SCR ripple, thereby affording a pure signal accurately indicative of actual motor speed.

This feedback circuit includes broadly tuned reactive components acting as a low pass filter and arranged to filter and bypass a broad spectrum of unwanted frequency responses relative to the sample voltage. While this feature is highly desirable at all speeds, it is particularly significant at low speeds, when the applied armature voltage is small and the corresponding sample signal would otherwise be subject to a poor signal-to-noise ratio, as heretofore encountered in the prior art circuits.

The sample signal level is compared to the speed potentiometer voltage setting to determine the amount of current flow through the control winding of the magnetic amplifier which in turn gates the controlled rectifier means accordingly.

A further feature of the invention resides in the provision of a full load protection circuit for shunting a portion, or all, of the control current from the magnetic amplifier in accordance with the relative value of the armature current to the pre-set torque or current limit. This is achieved by establishing a torque reference potential level at a switching device, for example, a transistor in accordance with the maximum torque setting against which is compared a voltage potential proportional to armature current. When a predetermined one of these voltage levels exceeds the other, the switching device is operative to shunt an amount of control current necessary to cause a reduction in the armature applied voltage, thereby diminishing the motor speed.

The circuits which establish the speed reference potential and the torque reference potential each include further unique features. The former incorporates a built-in time constant for the rate of change of the reference speed signal to prevent rapid changes of the speed setting dial from being reflected into the gating of the SCR.

The torque or current limit reference circuit includes provision for incorporating calibration links of different resistive values to provide automatic operating point adjustment for the torque limit circuitry to accommodate motors of various horsepower ratings.

The invention preferably employs a full wave bridge to convert AC input voltage to pulsating DC for the SCR which in turn is controlled by the speed and torque controls for speed determination.

With the foregoing in mind it is among the objects of the invention to provide a combination torque and speed regulating circuit for DC motors.

It is a further object of the invention to provide a circuit for speed regulation of a DC motor wherein a filtered signal sample, proportional to the pulsating DC voltage applied to the armature, is compared to an adjustable speed reference potential to control the amount of applied pulsating DC to the armature for speed regulation.

Another object of the invention is the provision of an adjustable torque controlled circuit for DC motors in which a voltage proportional to the armature current is compared to a selectable torque reference potential to control the amount of power applied to the armature for establishing a predetermined maximum load condition.

The invention will be described in greater detail with respect to the modifications thereof illustrated in the accompanying drawings wherein:

FIG. 1 is a circuit diagram depicting the components utilized in both the speed and torque control.

FIG. 2 is a wave form diagram illustrating a typical feedback voltage relative to the reference level for no-load condition, and FIG. 3 shows a similar diagram depicting conditions at full load.

Referring now to the drawings there is shown a motor armature 11 connected for adjustable speed and torque control. An AC source of power (not shown) is adapted to be connected to terminals 13 and 15 which extend over leads 17 and 19 to a full wave bridge rectifier 21. The pulsating DC output from bridge 21 appears between the positive lead 23 and negative lead 25 across which the motor field winding 27 is connected. The rectified full wave pulsating DC is applied to the armature 11 by way of silicon controlled rectifier 31 and brushes 33 and 35.

The supplied AC power is also applied to a self-saturating magnetic amplifier, generally designated at 41. This path is by way of leads 43 and 45 which extend to a primary winding 47 of an isolation transformer 49. This transformer supplies the isolated voltages necessary for the operation of the magnetic amplifier 41 and the torque or current reference circuit, generally indicated at 51.

The magnetic amplifier 41 is connected to secondary winding 53 which has a center tap lead 45 referenced back to the main positive supply lead 23. The ends of secondary winding 53 are connected to the gate windings 57 and 59 of the amplifier 41. The gate windings are respectively connected in series with "self-saturating" rectifiers 61 and 63, in turn connected to output lead 65 which extends to the gate or control electrode 67 of SCR31, in circuit with the resistor divider network including resistors 69 and 71.

Magnetic amplifier 41 includes a bias winding 75 connected across the main DC supply leads 23 and 25 by leads 77 and 79, the former including a fixed biased resistor 81 to determine the bias current which establishes the output for magnetic amplifier 41 in the absence of any "on" signal applied to its control winding 83.

The magnitude of the control current in magnetic amplifier control winding 83 is normally determined by the adjustable speed control circuitry which includes speed control potentiometer 85 connected in series with resistor 87 across DC mains 23 and 25. Resistor 87 prevents short circuiting of the mains when the potentiometer tap 89 is adjusted to the zero or lower end of speed control potentiometer 85. Thus, when the speed tap 89 is adjusted to its zero position, no "on" signal is applied to control winding 83 by way of lead 91 including series resistor 93.

Normal operation of the amplifier 41 is set by the current in the bias winding 75, such that in the absence of any current in control winding 83, the gate windings 57 and 59 are blocking most of the voltage applied from transformer 49 through the self-saturating rectifiers 61 and 63 including the resistor divider network with resistors 69 and 71 and the gate electrode to cathode junction of SCR31. The cathode side of SCR31 is to the right in FIG. 1, i.e., on the armature side and the anode of SCR31 is to the left or on the bridge side thereof. For this condition, the voltage appearing across resistor 71, and therefore the gate-to-cathode junction of SCR31, is of insufficient magnitude to fire the SCR so that it remains in its blocking state to prevent any voltage from appearing across armature 11.

Depending upon the speed setting desired for the motor, the speed potentiometer tap 89 is dialed toward its 100 end and capacitor 95 becomes charged through an effective time constant, essentially determined by resistor 87 and the value of capacitor 95. As the capacitor 95 voltage increases, an increasing current flows through resistor 93 and lead 91 to control winding 83 of amplifier 41. The return path for this control current is over lead 101, by way of blocking diode 103, and feedback resistor 105.

The increasing control current permits the magnetic amplifier 41 to begin to turn on and its gate windings 57 and 59 start conducting in the latter part of the cycle. The resulting pulsations of voltage apearing across resistor 71 and the gate-to-cathode junction of SCR31, turn the SCR on to begin conducting at a time during the latter part of the full wave DC pulsations, thus applying a portion of the DC rectified full wave pulsations to the parallel combination of the motor armature 11 and the feedback circuit 107.

The foregoing action persists, namely, the control winding current increases causing amplifier 41 to conduct earlier in the cycle which in turn increases the conduction angle of SCR31 to apply an increasing average voltage to armature 11 and feedback circuit 107. Armature voltage appearing across feedback resistor 105 is substantially the same, i.e., equal to the voltage selected by tap 89 of speed potentiometer 85, at which time a substantially steady state or normal operating condition obtains for the circuit. If the tap 89 of the speed control potentiometer 85 is moved further in the direction of its 100 end the foregoing action is repeated.

Conversely, if it is desired to reduce the motor speed, tap 89 is moved toward the zero end of potentiometer 85 but the current in the control winding 83 momentarily becomes zero because of the blocking action of diode 103, thus the SCR31 momentarily returns to its blocking state and remains in that condition until the voltage across feedback resistor 105 has dropped to a value substantially equal to the new reference level voltage at speed control potentiometer 85. This re-establishes control current in winding 83 but at the proper value to maintain the substantial voltage equality necessary for the new speed condition.

With the motor running at the same speed and no load, the voltage across feedback resistor 105 is essentially the same as the voltage at tap 89 of potentiometer 85.

However, if the feedback circuit 107 were a pure resistance divider network, then when the motor were loaded, the armature voltage would remain substantially the same or decrease slightly due to increased voltage drop across SCR31. If the armature voltage remained constant then the speed of the motor would decrease due to the increased IR loss in the armature. This is because in a DC motor the armature current is directly related to the load and the effective voltage is the applied voltage less the IR drop.

The present invention precludes these problems and permits considerable improved operation by providing a feedback circuit 107 which is not a pure resistance divider network but rather includes both reactive and resistive components. By way of example, the choke coil 111 having a value of 7 henrys is connected in series with a capacitor 113 of 0.68 microfarad, the combination being connected across the DC mains 23 and 25 to receive the same voltage applied to the armature 11. The resistance network, shunting capacitor 113, includes 470 ohm feedback resistor 105 and 2,500 ohm resistor 115.

With this type feedback circuit the application of a load to the motor results in the circuit increasing the applied armature voltage which tends to offset the increased IR loss in the motor resulting in the maintaining of the motor speed more nearly constant than heretofore available.

In FIG. 2 the feedback voltage is represented by wave 131 relative to the reference voltage level 133 for no load condition. As was mentioned, because of the diode 103, control current in winding 83 only flows in amplifier 41 when the reference voltage (at tap 89 of potentiometer 85) exceeds the feedback voltage. The hatched areas 135 represent the instantaneous current pulses in control winding 83 for this condition.

As the load on the motor is increased toward the full load condition of FIG. 3 the inductance of the armature 11 decreases. The changed armature inductance, in combination with the reactance of feedback circuit 107, approaches a tuned circuit condition such that the feedback voltage across resistor 105, as indicated at 131' in FIG. 3, develops a new relationship to the reference voltage 133'. Again only the cross hatched areas 135' indicate instantaneous current flow in control winding 83. When this current increases, the voltage supplied to the motor armature of course increases to provide the more nearly constant motor speed with increased load.

A 0.1 ohm resistor 141 (FIG. 1) is provided to develop a voltage drop directly proportional to the armature current. This voltage provides a measure of motor torque or load and is utilized in the torque limit control. A switching device, in the form of transistor 143, is provided to shunt or drain off a part of the control current normally passing over lead 91 to control winding 83 whenever the motor load or torque reaches a predetermined maximum value. The voltage across resistor 141 is compared to a selectable reference voltage established by the torque or current limit reference circuit 51 to determine conduction of transistor 143.

The torque or current limit reference voltage is selectable across potentiometer 145 by tap 147. The input voltage for reference circuit 51 is developed from transformer 49 secondary winding 149. A half-wave rectifier 151 and filter condenser 153 insures the application of DC potential to the potentiometer 145. A voltage divider including resistors 151 and 153 is connected in parallel with potentiometer 145 and the center tap thereof referenced over lead 155 to negative DC main 25.

The current limit reference setting of tap 147 establishes, over lead 157, a reference voltage at junction point 161 between the 120 ohm base lead resistor 163 and the 250 microfarad surge capacitor 165. The armature current voltage drop across resistor 141 is compared to the reference potential at point 161 by virtue of lead 167 and a 270 ohm series resistor 169. If the load on the motor is increased a point is reached where the signal from resistor 141 exceeds the bias or reference potential at point 161 to permit transistor 143 to conduct. The establishment of conduction in transistor 143 shunts some of the control current from lead 91 over collector lead 171 to decrease the output of magnetic amplifier 41 and the conduction angle of SCR31. Thus, the motor slows down in speed while maintaining the load current.

As the load is increased more and more, transistor 143 shunts more current from amplifier 41 until a condition is reached where very little current flows through control winding 83. At this point the output voltage from SCR31 is just sufficient to allow the amount of current set by the torque limit control circuit 51 to flow in the armature circuit with the motor stopped. It is this maximum load current which is adjusted by tap 147 of torque potentiometer 141.

The maximum current occurs when the short circuit calibrator link 171 is connected between terminals 173 and 175 by switch 177 and tap 147 of potentiometer 145 is set at the 100 end. The minimum flow of current limit action occurs when link 171 becomes an open circuit. Intermediate valued calibration resistors 181 and 183 may be selected by switch arm 177 to automatically calibrate the circuit for different horsepower motors than the one calibrated with link 171 of zero resistance. Resistors 151 and 153 determine the range of current selectable by the potentiometer 145.

The circuit is otherwise provided with conventional arrangements, such as the commutating or free-wheeling diode 201; the transient over voltage protective diode 200 in bridge 21; and the dynamic braking circuit including resistor 203 and switch 205 which includes all seven of the switch contacts in the form of an open, forward and reverse single blade switch for determining the direction of rotation for the motor, as well as providing the dynamic braking function. For forward operation, contacts 211, 212 and 213 are closed and contacts 214, 215, 216 and 205 are open. This applies a voltage across motor armature 11 which is positive at brush 33 and negative at brush 35, providing a clockwise direction of rotation.

When the control switch is thrown to the off position, contacts 211, 212, 213, 215, 216 and 214 open with contact 205 closing to place dynamic braking resistor 203 across the armature 11 to dissipate the energy developed by the motor when acting as a generator.

In the reverse position contacts 211, 212, 213 and 205 open and contacts 214, 215 and 216 close reversing the polarity of the voltage applied to the armature resulting in a counterclockwise direction of rotation.

In connection with the feedback circuit 107, it should be appreciated that the tuning of this circuit permits the bypassing of a rather broad spectrum of unwanted frequency manifestations so that the signal voltage developed across feedback resistors 105 is relatively free of spurious responses. Further, the provision of this low band pass filter network provides ripple smoothing to the chopped pulsating DC being supplied to the armature by SCR31, thus again to improve the quality of the feedback signal 105 for control purposes.

The tuned or nearly tuned condition for feedback circuit 107 is most nearly achieved as full load is approached. This is because the inductance of the motor armature decreases as the load increases and the tuning parameters are set for the higher load conditions. Thus, as the load increases, the applied armature voltage increases due to the effects of the reactive components which offset the motor armature IR losses to maintain nearly constant speed.

While a preferred embodiment of the invention has been illustrated and described, it is believed that modifications thereof within the principles of the invention will occur to those skilled in the art from a reading of the detailed description presented. It is therefore intended that the invention be limited only by the scope of the appended claims wherein what is claimed is:

1. In a direct current motor control circuit for applying DC pulsating voltage to the armature thereof, the combination comprising a full wave rectifier bridge for converting AC into pulsating DC, a potentiometer for deriving an adjustable reference potential level from the DC for speed control, an SCR responsive to the DC for applying at least a portion thereof to the armature of the motor, a magnetic amplifier including a controlled winding responsive to the adjustable reference potential level to gate the SCR at selectable times during the DC pulsations to determine said portion of DC applied to the armature, a low pass filter in parallel with the armature and responsive to the portion of DC to modify the adjustable reference potential level at the control winding, a resistor in series with the armature for deriving a voltage proportional to the armature current, a further potentiometer for establishing a torque reference voltage in accordance with the predetermined maximum load current, and transistor switching means responsive to said torque reference voltage and said armature current voltage further to modify the effective adjustable reference potential level and the control winding whenever a predetermined one of said voltages exceeds the other.

2. The circuit of claim 1 including a capacitor connected across said first mentioned potentiometer where the adjustable potential level is derived and a resistor in series with the potentiometer whereby said capacitor and said resistor provide an RC time constant to changes of the potentiometer setting.

3. The circuit of claim 1 including switching means in series with said further potentiometer and a plurality of calibration resistances including one of zero resistance for setting an operating point for said control circuit for motors of different horse power ratings.

4. The circuit of claim 1 wherein the low pass filter includes a choke coil, a potentiometer and a capacitor, said coils and potentiometer being connected in series and said capacitor shunting the potentiometer.

5. The apparatus of claim 4 wherein the parameters of the coil and capacitor are selected to provide substantially a tuned condition at substantially full load when the effect of the armature inductance is considered, and including unidirectional means in parallel with the filter for bypassing a current produced by the armature.

References Cited
UNITED STATES PATENTS

| | | | |
|---|---|---|---|
| 2,799,819 | 7/1951 | Brown | 318—332 X |
| 3,123,757 | 3/1964 | Gaudet | 318—345 X |
| 3,176,209 | 3/1965 | Cappello | 318—332 |
| 3,222,585 | 12/1965 | Lobb | 318—345 X |
| 3,222,586 | 12/1965 | Fontenote et al. | 318—345 X |

ORIS L. RADER, *Primary Examiner.*

J. J. BAKER, *Assistant Examiner.*